US008864626B2

(12) United States Patent
Saji et al.

(10) Patent No.: US 8,864,626 B2
(45) Date of Patent: Oct. 21, 2014

(54) HYDRAULIC CONTROL DEVICE OF AUTOMATIC TRANSMISSION

(75) Inventors: Koshiro Saji, Hiroshima (JP); Shinya Kamada, Kure (JP); Shotaro Nagai, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 414 days.

(21) Appl. No.: 13/370,717

(22) Filed: Feb. 10, 2012

(65) Prior Publication Data

US 2012/0252631 A1 Oct. 4, 2012

(30) Foreign Application Priority Data

Mar. 31, 2011 (JP) ................................. 2011-078088

(51) Int. Cl.
*F16H 61/4078* (2010.01)
*F16H 61/12* (2010.01)
*F16H 61/686* (2006.01)

(52) U.S. Cl.
CPC .......... *F16H 61/12* (2013.01); *F16H 2061/126* (2013.01); *F16H 61/686* (2013.01)
USPC .......................................... 477/127; 477/143

(58) Field of Classification Search
None
See application file for complete search history.

(56) References Cited

U.S. PATENT DOCUMENTS

| 6,494,803 | B2 * | 12/2002 | Suzuki et al. | 475/119 |
| 7,713,165 | B2 * | 5/2010 | Kim | 477/45 |
| 8,182,397 | B2 * | 5/2012 | Shimizu et al. | 477/127 |
| 2007/0066435 | A1 * | 3/2007 | Takagi et al. | 475/127 |

FOREIGN PATENT DOCUMENTS

JP 2005-344741 A 12/2005

* cited by examiner

*Primary Examiner* — Robert A Siconolfi
*Assistant Examiner* — Huan Le
(74) *Attorney, Agent, or Firm* — Alleman Hall McCoy Russell & Tuttle LLP (57) ABSTRACT

A hydraulic control device of an automatic transmission is provided, which includes a hydraulic control circuit with a pressure reducing valve including a first friction element for achieving a first gear position and a second friction element for achieving a second gear position that produces a lower speed than the first gear position. The hydraulic control circuit further includes a switch valve formed with an input port which is inputted with the line pressure in a forward gear position range, and which is switched between a first state where the input port communicates with a first oil path communicating with the first friction element in a failure state of power distribution to the plurality of hydraulic control valves, and a second state where the input port communicates with the second friction element in the same power distribution failure state. The switch valve includes various control ports to control its function.

8 Claims, 7 Drawing Sheets

|   |   | LOW CLUTCH (40) | HIGH CLUTCH (50) | LR BRAKE (60) | 26 BRAKE (70) | R35 BRAKE (80) |
|---|---|---|---|---|---|---|
| P |   |   |   | COUPLED |   |   |
| R |   |   |   | COUPLED |   | COUPLED |
| N |   |   |   | COUPLED |   |   |
| D | 1ST GEAR | COUPLED |   | COUPLED |   |   |
|   | 2ND GEAR | COUPLED |   |   | COUPLED |   |
|   | 3RD GEAR | COUPLED |   |   |   | COUPLED |
|   | 4TH GEAR | COUPLED | COUPLED |   |   |   |
|   | 5TH GEAR |   | COUPLED |   |   | COUPLED |
|   | 6TH GEAR |   | COUPLED |   | COUPLED |   |

HYDRAULIC CONTROL DEVICE OF AUTOMATIC TRANSMISSION

BACKGROUND

The present invention relates to a hydraulic control device of an automatic transmission mounted on a vehicle, especially relating to a control at a time of failure in power distribution to a solenoid valve for hydraulic control, and belongs to a technical field of automatic transmissions for vehicles.

An automatic transmission mounted on a vehicle automatically switches gear position by selectively coupling a plurality of friction elements according to an operating state of the vehicle, and is equipped with a hydraulic control device for controlling the coupling of the friction elements. The hydraulic control device is provided with, for example, a switch valve for switching oil paths therebetween leading to the respective friction elements, and a hydraulic control valve for controlling a coupling hydraulic pressure to be supplied to each friction element. At least one of these valves is configured by a solenoid valve, and the solenoid valve is actuated by an electric signal from a controller and performs, for example, the switch between the oil paths and the control of the hydraulic pressure.

However, in using the solenoid valve in the hydraulic control device as above, a failure in which power distribution to the solenoid valve is disrupted, such as, a connecting terminal disengagement or a power distribution line disconnection, (hereinafter, referred to as the "power distribution failure") may occur, therefore, a countermeasure, that is, a fail safe measure is required to be provided. For example, JP2005-344741A discloses an invention relating to such a fail safe measure.

The fail safe measure in JP2005-344741A has a configuration including linear solenoid valves for friction elements, respectively. In this configuration, a sequence valve for switching its state between a normal communicating state and a failure communicating state is arranged between the linear solenoid valves and a manual valve, and an on/off solenoid valve for setting itself to an off state at the time of the power distribution failure, so as to switch the sequence valve to the failure communicating state, is provided. The manual valve and a drain port of the predetermined linear solenoid valve are configured to communicate in the failure communicating state. Further, a high/low switch valve for changing the state to a low-speed communicating state in a case where the gear position is changed to high in the failure communicating state, and the gear position is switched to an N-gear position range and then to a travel range again, is provided.

Thereby, the sequence valve transitions to the failure communicating state at the time of the power distribution failure, and the hydraulic pressure supplied from the manual valve is supplied to the high gear position or the low gear position via the high/low switch valve. Thereby, a predetermined gear position is set and travel of the vehicle can be continued.

However, in the invention disclosed in JP2005-344741A, as the fail safe measure, the sequence valve arranged between the manual valve and the linear solenoid valves for the friction elements and for switching its state between the normal communicating state and the failure communicating state, the on/off solenoid valve for switching the sequence valve to the failure communicating state at the time of the power distribution failure, and the high/low switch valve for switching the gear position between the high gear position and the low gear position are required, and thereby, the configuration of the hydraulic control device becomes complex and is increased in cost.

In order to solve the above problems, the present invention is configured as follows.

Means for Solving the Problems

According to one aspect of the invention, a hydraulic control device of an automatic transmission, including a hydraulic control circuit provided with a plurality of friction elements to be coupled by, being supplied with a line pressure and a plurality of hydraulic control valves is provided. The hydraulic control circuit achieves a gear position corresponding to an operating state by selectively supplying the line pressure to one or more of the friction elements. The device includes a pressure reducing valve including, as the friction elements, a first friction element for achieving a first gear position and a second friction element for achieving a second gear position that produces a lower speed than the first gear position, the pressure reducing valve serving as one of the plurality of hydraulic control valves to reduce the line pressure, and a switch valve formed with an input port to be inputted with the line pressure in a forward gear position range, and for switching its state between a first state where the input port is communicated with a first oil path communicating with the first friction element in a state of failure of power distribution to the plurality of hydraulic control valves and a second state where the input port is communicated with the second friction element in the same power distribution failure state. The switch valve is formed with, as ports for the switch control, a first control port to which a first control pressure is inputted so that the switch valve is biased toward the first state, a second control port to which a second control pressure outputted from the pressure reducing valve is inputted so that the switch valve is biased toward the second state, and a third control port to which the line pressure is inputted only when the line pressure is inputted to the input port in the first state and for fixing the switch valve in the first state regardless of the control pressures at the first and second control ports. In a state where the line pressure is not inputted to the third control port and the control pressure is inputted to the first control port, the switch valve transitions to the first state when the control pressure inputted to the second control port is reduced by the pressure reducing valve, and the switch valve transitions to the second state when the control pressure inputted to the second control port is not reduced by the pressure reducing valve.

In one embodiment, the pressure reducing valve may be a normally open solenoid valve for reducing the line pressure in a power distributing state to output the second control pressure that is lower than the first control pressure.

Here, the first and second control pressures include a case using the control pressure that is generated by reducing the line pressure by the pressure reducing valve and a case using the line pressure itself as the control pressure.

According to the above configurations, when the power distribution failure to the plurality of hydraulic control valves has not occurred, the control pressure is inputted to the first control port of the switch valve, and the control pressure reduced by the pressure reducing valve is inputted to the second control port at a time of switching a range to the forward gear position range or in a neutral gear position range before the forward gear position range, thereby, the switch valve is in the first state. Therefore, the line pressure is inputted to the third control port immediately after the switching to the forward gear position range, and the switch valve is fixed to the first state. Then in this state, an automatic gear shifting including the first and second gear positions is performed by the actuation of the hydraulic control circuit.

On the other hand, in this state, if the power distribution failure to the plurality of hydraulic control valves occurs, because the switch valve is fixed to the first state and the input port of the switch valve is communicated with the first oil path, the line pressure inputted to the input port is supplied to the first friction element from the first oil path and the first friction element is coupled, and thereby, the first gear position is achieved. Thereby, even in the case of the power distribution failure, the vehicle can travel in the first gear position.

Further, in cases where, for example, the vehicle stops for a while or the engine is stopped and then restarted, when the gear position range is switched to the neutral gear position range, the input of the line pressure to the third control port of the switch valve to which the line pressure is inputted in the forward gear position range is stopped and the pressure reducing valve does not perform the pressure reduction due to a lack of power distribution. Therefore, the control pressure that is not reduced is inputted to the second control port. Thereby, the switch valve switches to the second state.

Then, if the gear position range is switched from the neutral gear position range to the forward gear position range to restart the vehicle, the line pressure is not inputted to the third control port because the switch valve is in the second state, and the control pressure inputted to the second control port is not reduced, thereby, the switch valve does not switch to the first state and the second state is maintained. Therefore, the line pressure inputted to the input port of the switch valve is supplied to the second friction element via the second oil path, the second friction element is coupled, and thereby, the gear position becomes the second gear position.

In this case, because the second gear position is a lower gear position than the first gear position, a good start acceleration performance is obtained compared to the case of starting in the first gear position, and because the first gear position is a higher gear position than the second gear position, when the power distribution failure to the plurality of hydraulic control valves occurs while travelling forward in especially the high gear position and the gear position switches to the first gear position, a sudden deceleration is suppressed.

In one embodiment, the switch valve may be formed with the first control port on one end side of a spool and the second control port on the other end side of the spool, and a pressure receiving area of the second control port side of the spool may be formed larger than a pressure receiving area of the first control port side so that in a state where the line pressure is not inputted to the third control port and the first control pressure is inputted to the first control port, the switch valve may become in the second state when the second control pressure inputted to the second control port is not reduced by the pressure reducing valve.

According to the above configuration, the first and second control ports of the switch valve are provided on the both sides of the spool, respectively, and the pressure receiving area of the spool on the second control port side is formed larger than the pressure receiving area on the first control port, therefore, in the state in which the line pressure is not inputted to the third control port and the first control pressure is inputted to the first control port, the switching of the switch valve between the first state and the second state is performed based on whether the second control pressure inputted to the second control port is reduced by the pressure reducing valve. Thereby, the switching is achieved by a simple configuration.

The device may further include a hydraulic pressure adjusting valve for generating the line pressure by adjusting a discharging pressure of an oil pump that is driven by an engine. The hydraulic pressure adjusting valve may be formed with a pressure adjusting port to which the control pressure outputted from the pressure reducing valve is inputted and adjusts the line pressure according to the control pressure.

According to the above configuration, with the hydraulic pressure adjusting valve, the line pressure is adjusted corresponding to the control pressure outputted from the pressure reducing valve. Thereby, the adjusting control of the line pressure and the switching control of the switch valve between the first and second states are performed by the single pressure reducing valve. Therefore, compared to the case where these controls are performed by using dedicated solenoid valves, respectively, the complication and the increase in cost of the configuration of the hydraulic control circuit are suppressed.

DETAILED DESCRIPTION OF THE EMBODIMENTS

Hereinafter, an embodiment of the present invention is described in detail with reference to the appended drawings.

Figure 1:
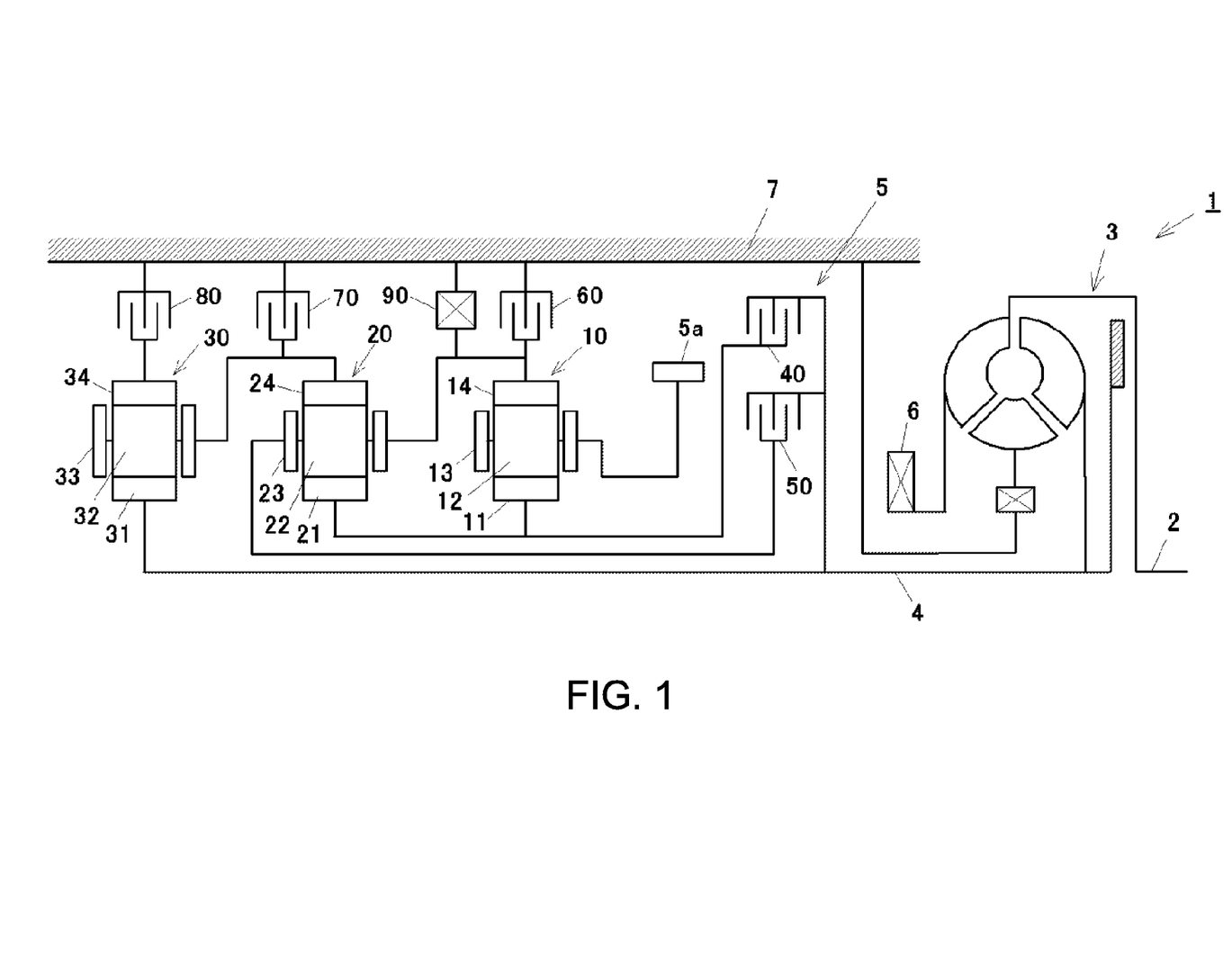
FIGS. 1 and 1A are schematic diagrams of an automatic transmission according to an embodiment of the invention.
Figure 1A:
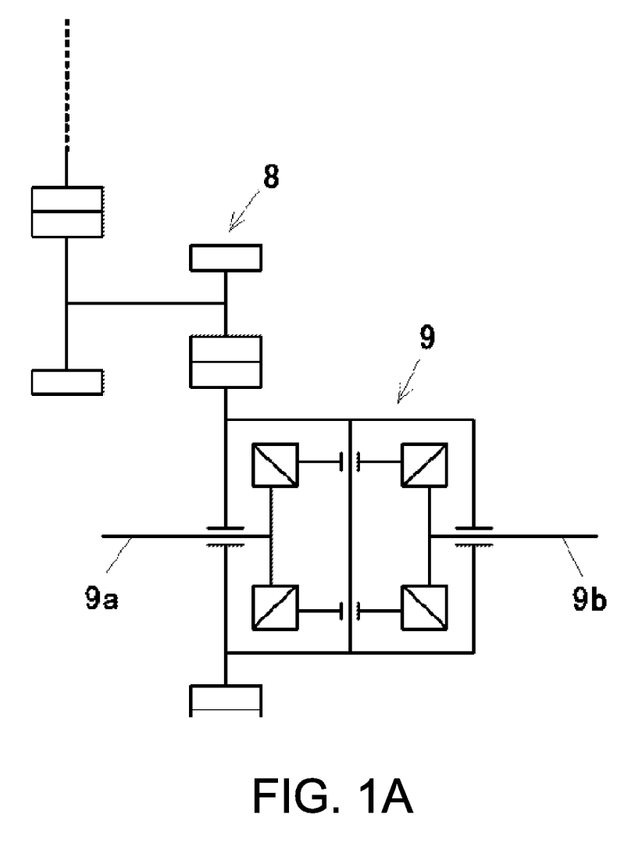

FIGS. 1 and 1A are schematic diagrams illustrating a configuration of an automatic transmission according to an embodiment of the invention. The automatic transmission 1 is equipped in a vehicle with a transversely-mounted engine, such as a front-engine front-drive vehicle, and includes main configuration elements such as a torque converter 3 attached to an engine output shaft 2, a transmission mechanism 5 to which a rotational output power of the torque converter 3 is inputted via an input shaft 4, and an oil pump 6 that is actuated by the engine output shaft 2 via the torque converter 3. These elements are accommodated in a transmission case 7. Further, the rotational output power of the transmission mechanism 5 is transmitted from an output gear 5a to a differential gear 9 via a counter drive mechanism 8, and thereby, right and left axles 9a and 9b are actuated.

The transmission mechanism 5 includes first, second and third planetary gear sets 10, 20 and 30 (hereinafter, they are referred to as the "first, second and third gear sets" correspondingly) that are sequentially arranged in an axial direction from the side of the torque converter 3. As friction elements for switching a power transmission path configured by these gear sets 10, 20 and 30, low and high clutches 40 and 50 for selectively transmitting the output power from the torque converter 3 to the side of the gear sets 10, 20 and 30, an LR brake 60, a 26 brake 70, and an R35 brake 80 for fixing a predetermined rotational element of the respective gear sets 10, 20 and 30 are provided. Note that, a one-way clutch 90 is arranged in parallel to the LR brake 80.

The first, second and third gear sets 10, 20 and 30 are all single-pinion type planetary gear sets and are constituted with sun gears 11, 21 and 31, pinion gear subsets 12, 22 and 32 where a plurality of pinion gears are meshed together with the sun gears 11, 21 and 31, carrier gears 13, 23 and 33 for supporting the pinion gear subsets 12, 22 and 32, and ring gears 14, 24 and 34.

Further, the input shaft 4 is coupled to the sun gear 31 of the third gear set 30, also, the sun gear 11 of the first gear set 10 and the sun gear 21 of the second gear set 20, the ring gear 14 of the first gear set 10 and the carrier gear 23 of the second gear set 20, and the ring gear 24 of the second gear set 20 and the carrier gear 33 of the third gear set 30 are coupled to each other, respectively. Further, the output gear 5a is coupled to the carrier gear 13 of the first gear set 10.

Moreover, the sun gear 11 of the first gear set 10 and the sun gear 21 of the second gear set 20 are disconnectably coupled to the input shaft 4 via the low clutch 40, and the carrier gear 23 of the second gear set 20 is disconnectably coupled to the input shaft 4 via the high clutch 50.

In addition, the ring gear 14 of the first gear set 10 and the carrier gear 23 of the second gear set 20 are disconnectably coupled to the transmission case 7 via the LR brake 60 and the one-way clutch 90 which are arranged in parallel to each other. The ring gear 24 of the second gear set 20 and the carrier gear 33 of the third gear set 30 are disconnectably coupled to the transmission case 7 via the 26 brake 70, and further the ring gear 34 of the third gear set 30 is disconnectably coupled to the transmission case 7 via the R35 brake 80.

Figure 2:
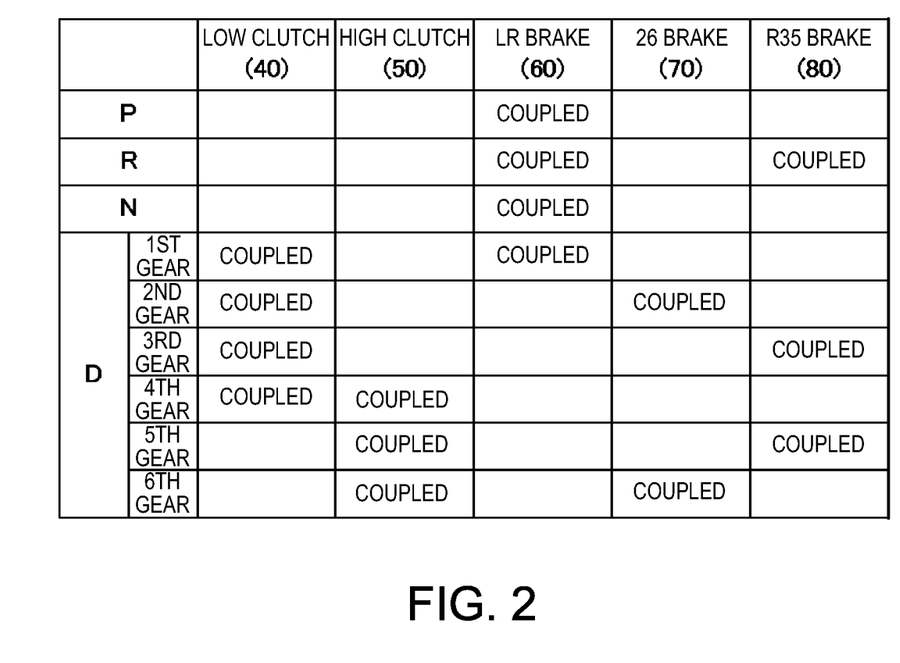
FIG. 2 is a table showing a relation of combinations with coupling friction elements and gear positions.

With the above described configuration, in the transmission mechanism 5, each of P (parking), R (reverse) and N (neutral) gear position ranges and first to sixth gears in a D (drive) gear position range (forward gear position range) are achieved by combinations of coupling states of the low clutch 40, the high clutch 50, the LR brake 60, the 26 brake 70, and the R35 brake 80, and relations of the combinations with the gear position ranges and the gear positions are shown in a table in FIG. 2.

Figure 3:
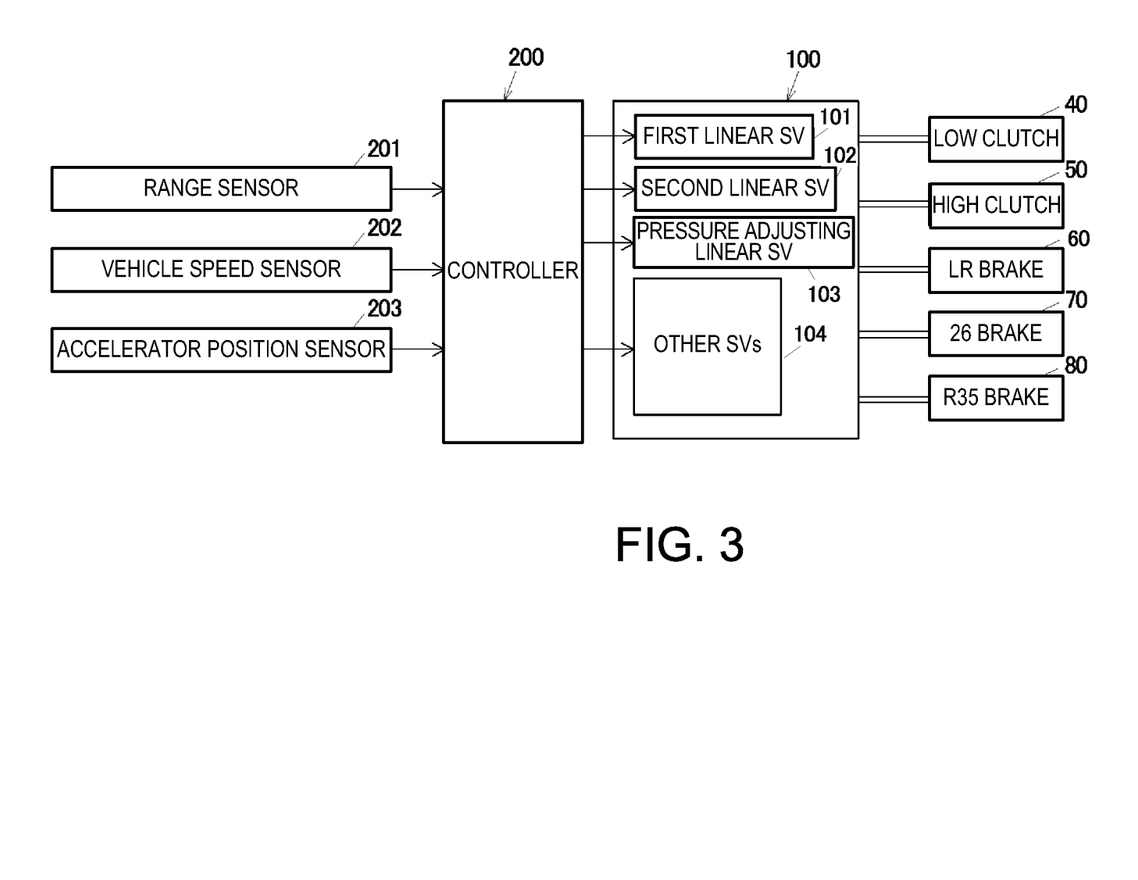
FIG. 3 is a block diagram showing a hydraulic control system.

Moreover, as shown in FIG. 3, the automatic transmission 1 includes a hydraulic control circuit 100 for achieving the gear positions by supplying a coupling line pressure to the clutches 40 and 50 and the brakes 60, 70 and 80 selectively. The circuit 100 includes first and second linear solenoid valves 101 and 102 (hereinafter, the "solenoid valve" is referred to as the "SV") for the gear shift control, a pressure adjusting linear SV 103 for the line pressure, and one or more other SVs 104.

Further, a controller 200 for controlling the SVs 101 to 104 is provided to the automatic transmission 1. The controller 200 is inputted with a signal from a gear position range sensor 201 for detecting a gear position range selected through an operation by a driver, a signal from a vehicle speed sensor 202 for detecting a vehicle speed of the vehicle, and a signal from an accelerator position sensor 203 for detecting a depression amount of the accelerator by the driver, and the controller 200 outputs control signals to the SVs 101 to 104 based on the signals.

Thereby, opening amounts of the SVs 101 to 104 are controlled according to the selected gear position range and an operating state of the vehicle, the line pressure is supplied to the clutches 40 and 50, and the brakes 60, 70 and 80 selectively, and thereby, each of the gear positions is achieved corresponding to the table in FIG. 2.

Here, the first linear SV 101 is a normally open type and is opened without the power distribution and closed with the power distribution. Further, the second linear SV 102 is a normally closed type and is closed without the power distribution and opened with the power distribution. Further, although the pressure adjusting linear SV 103 reduces the inputted original pressure corresponding to its opening by being controlled according to a distributed current for each gear position range and gear position, because the linear SV 103 is the normally open type, it is fully opened without the power distribution and outputs the original pressure as it is.

Next, the configuration of the hydraulic control circuit 100 is explained.

Figure 4:
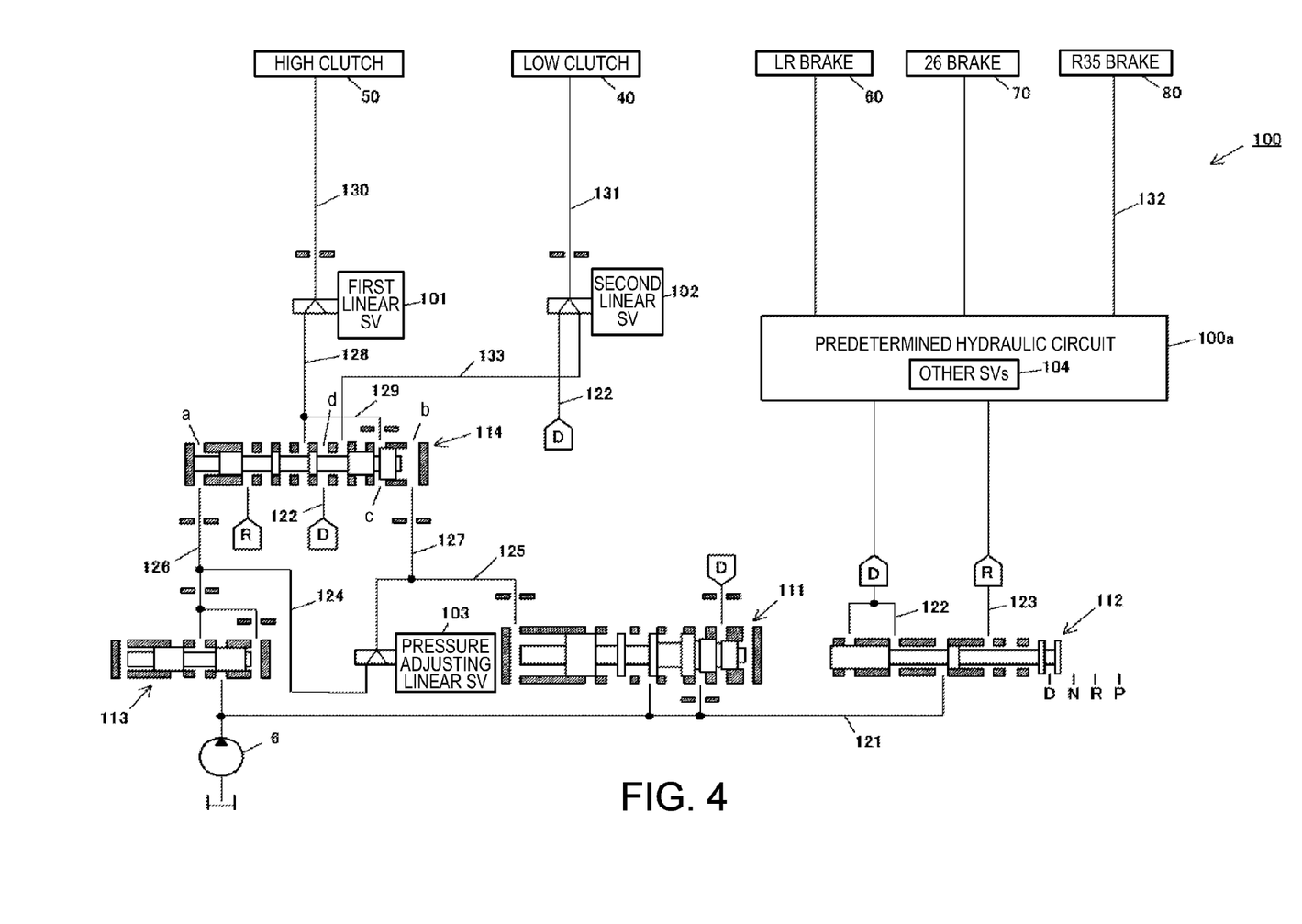
FIG. 4 is a circuit diagram of a hydraulic control circuit.

As shown in FIG. 4, the hydraulic control circuit 100 includes, in addition to the SVs 101 to 103, a regulator valve 111 for adjusting a discharge pressure of the oil pump 6 to the line pressure and supplying it to a main line 121, a manual valve 112 for being operated by the gear position range selecting operation by the driver, a reducing valve 113 for generating a predetermined control pressure by reducing the line pressure, and, as one of gear shifting valves, a high cut valve 114.

Further, the hydraulic control circuit 100 is provided with a predetermined hydraulic circuit 100a for the gear shift provided with the various valves including the other SV(s) 104 shown in FIG. 3, and is further provided with, although not illustrated in the drawings, a circuit for supplying the operation oil to the torque converter 3 and controlling a lock up clutch in the torque converter 3.

Further, the line pressure of the main line 121 is outputted to a D-gear position range line 122 when the manual valve 112 is at an operation position of the D-gear position range, and is outputted to an R-gear position range line 123 when the manual valve 112 is at an operation position of the R-gear position range.

Further, the control pressure generated by reducing the line pressure with the reducing valve 113 is supplied to the pressure adjusting linear SV 103 for the line pressure by a line 124, is further reduced by the SV 103, and is inputted to a pressure adjusting port of the regulator valve 111 by a line 125. In this case, because the pressure adjusting linear SV 103 reduces the control pressure according to the operating state of the vehicle indicated by the signal from the controller 200, the line pressure generated by the regulator valve 111 is also adjusted to be the hydraulic pressure according to the operating state.

Then, the control pressure generated by the reducing valve 113 is supplied to a first control port "a" at an end of the high cut valve 114 by a line 126 and biases a spool rightward with respect to FIG. 4 (hereinafter, it may simply be referred to as the "right position"), and the controlled pressure further reduced by the pressure adjusting linear SV 103 is supplied to a second control port "b" at the other end of the high cut valve 114 by a line 127 and biases the spool leftward (hereinafter, it may simply be referred to as the "left position").

The high cut valve 114 further has an input port "d" inputted with the line pressure from the D-gear position range line 122 and a third control port "c" inputted, when the spool is at the right position and the input port "d" is communicated with a line 128 on the downstream, with the line pressure from a line 129 branched from the line 128 as a lock pressure. When the lock pressure is inputted to the third control port "c", the spool is fixed to the right position regardless of the input of the control pressure to the first and second control ports "a" and "b", and the hydraulic pressure of the inputted control pressure.

Further, when the input port "d" of the high cut valve 114 is communicated with the line 128, the line pressure is supplied to the first linear SV 101 by the line 128, and when the SV 101 is opened (no power distribution), the line pressure is further supplied to the high clutch 50 via a line 130, thereby, the high clutch 50 is coupled.

Further, the D-gear position range line 122 supplies the line pressure to the second linear SV 102, and when the SV 102 is opened (under power distribution), the line pressure is further supplied to the low clutch 40 via a line 131, thereby, the low clutch 40 is coupled.

Note that, when the one or more other SVs 104 in the predetermined hydraulic circuit 100*a* are not distributed with the power, the predetermined hydraulic circuit 100*a* communicates the D-gear position range line 122 with a line 132 leading to the R35 brake 80, and thereby, the line pressure is supplied to the R35 brake 80 and the R35 brake 80 is coupled.

According to the above configuration, in the hydraulic control circuit 100, by the power distribution control to the first and second linear solenoid valves 101 and 102 and the other SV(s) 104 in the predetermined hydraulic circuit 100*a*, the low clutch 40, the high clutch 50, the LR brake 60, the 26 brake 70, and the R35 brake 80 are selectively coupled, and according to the table in FIG. 2, the six gears in forward and a reverse gear can be achieved.

That is, in the D-gear position range, the first gear is achieved by coupling the low clutch 40 and the LR brake 60, the second gear is achieved by coupling the low clutch 40 and the 26 brake 70, the third gear is achieved by coupling the low clutch 40 and the R35 brake 80, the fourth gear is achieved by coupling the low clutch 40 and the high clutch 50, the fifth gear is achieved by coupling the high clutch 50 and the R35 brake 80, and the sixth gear is achieved by coupling the high clutch 50 and the 26 brake 70.

Further, in the R-gear position range, the reverse gear is achieved by coupling the LR brake 60 and the R35 brake 80. Note that, in the P-gear position range and the N-gear position range, the LR brake 60 is coupled to be prepared for starting the vehicle in the first gear.

Moreover, a fail safe function for when a power distribution failure to the first and second linear SVs 101 and 102, the pressure adjusting linear SV 103, and the other SV(s) 104 occurs is provided to the hydraulic control circuit 100. Next, the fail safe function is explained.

First, the configuration of the high cut valve 114 for realizing the fail safe function is explained in further detail. In the high cut valve 114, when the lock pressure is inputted to the third control port "c" as described above, the spool is fixed to the right position regardless of whether the control pressure is inputted to the other control ports "a" and "b" and the hydraulic pressure of the inputted control pressure, and under normal travel, the configuration of the high cut valve 114 is in the above state.

Further, even in the case where the lock pressure is not inputted to the third control port "c", if the control pressure from the reducing valve 113 is inputted to the first control port "a" and the control pressure further reduced by the pressure adjusting linear SV 103 is inputted to the second control port "b", the spool is also at the right position. Hereinafter, the state in which the spool is at the right position is referred to as the "first state."

On the other hand, in the high cut valve 114, a pressure receiving area on the second control port "b" side is formed to be larger than that on the first control port "a" side, and in a case where the lock pressure is not inputted to the third control port "c" and the control pressure that is not reduced by the pressure adjusting linear SV 103, that is, the control pressure with the same hydraulic pressure as the control pressure at the first control port "a" is inputted to the second control port "b", due to the difference in the pressure receiving area, the spool is at the left position. Hereinafter, the state in which the spool is at the left position is referred to as the "second state."

Figure 5:
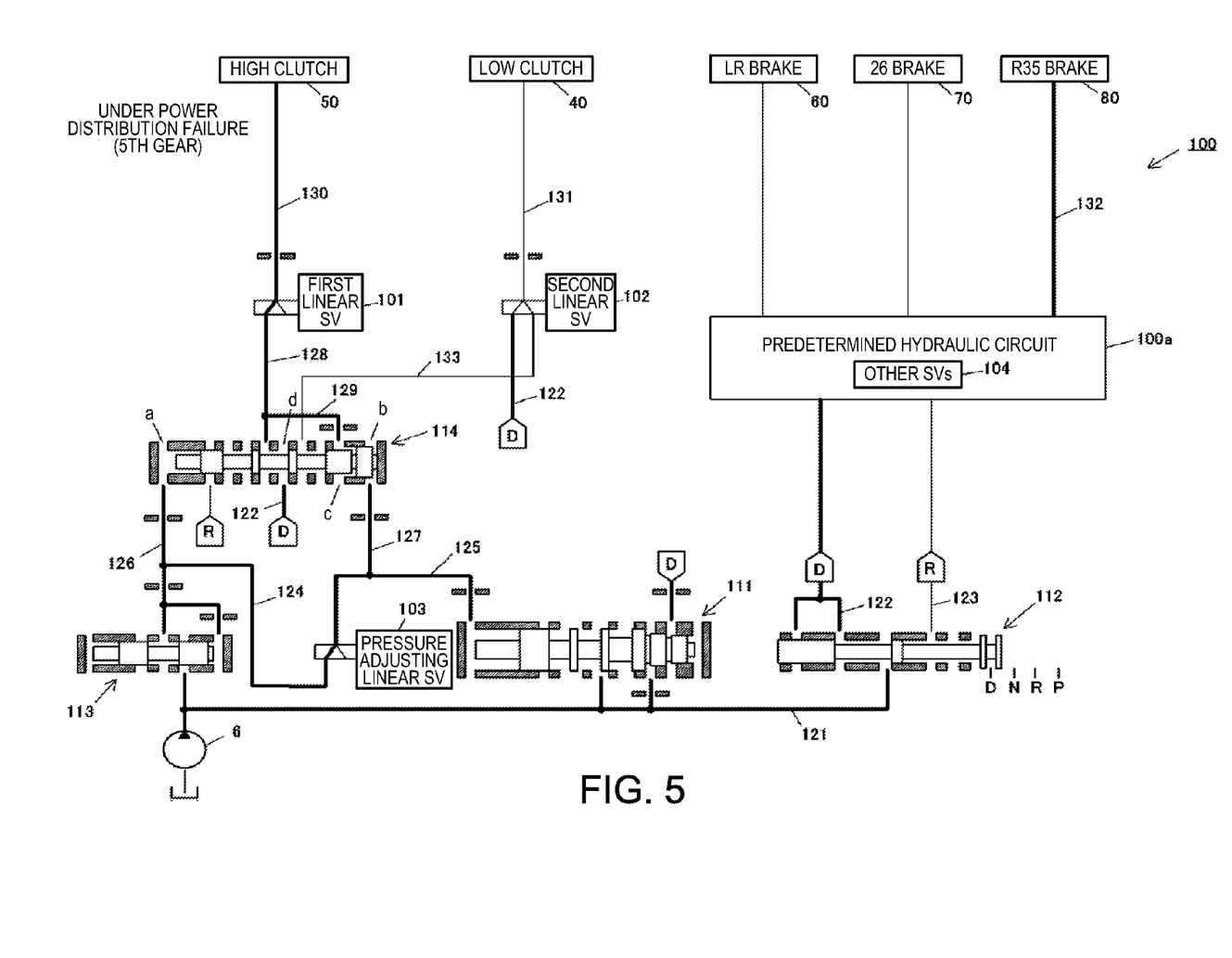
FIG. 5 is a hydraulic circuit diagram showing a state with a high gear position at a time of a power distribution failure.

If assumed that the power distribution failure has just occurred during travel in the D-gear position range, as shown in FIG. 5, because the high cut valve 114 is in the first state and the first linear SV 101 of the normally open type opens, the line pressure inputted to the input port "d" of the high cut valve 114 is outputted to the line 128, further outputted to the line 130 via the first linear SV 101, and finally supplied to the high clutch 50 via the line 130. Thereby, the high clutch 50 is coupled.

On the other hand, the second linear SV 102 is closed due to being the normally closed type, therefore, the line pressure is not supplied from the D-gear position range line 122 to the low clutch 40 via the line 131, and the low clutch 40 is not coupled.

Moreover, the other SV(s) 104 in the predetermined hydraulic circuit 100*a* opens or closes due to no power distribution, thereby, the line pressure is supplied from the D-gear position range line 122 to the R35 brake 80 via the line 132, and the R35 brake 80 is coupled. Thereby, the gear position becomes the fifth gear by coupling the high clutch 50 and the R35 brake 80, and travel in the fifth gear becomes possible even after the occurrence of the power distribution failure.

Note that, here, because the pressure adjusting linear SV 103 of the normally open type is also under no power distribution, the operation of reducing the control pressure by the SV 103 is not performed, and the control pressure generated by the reducing valve 113 is outputted from the SV 103 as it is and is inputted to the second control port "b" of the high cut valve 114 via the line 127. Therefore, although the control pressure with the same hydraulic pressure is inputted to each of the first and second control ports "a" and "b" at both ends of the high cut valve 114, because the lock pressure is inputted to the third control port "c", the high cut valve 114 is maintained in the first state in which the spool is at the right position. Therefore, the state in which the high clutch 50 is coupled, that is, the fifth gear state is maintained.

Meanwhile, in the above state, if the gear position is switched to the N-gear position range when, for example, the vehicle is stopped, due to the input of the line pressure to the input port "d" of the high cut valve 114 being stopped because the supply of the line pressure from the manual valve 112 to the D-gear position range line 122 is stopped, the input of the lock pressure from the lines 128 and 129 to the third control port "c" of the high cut valve 114 is also stopped.

Further, because the pressure adjusting linear SV 103 of the normally open type is also under no power distribution, the operation of reducing the control pressure by the SV 103 is not performed, and the control pressure generated by the reducing valve 113 is outputted from the SV 103 as it is and is inputted to the second control port "b" of the high cut valve 114 via the line 127.

Therefore, the control pressure with the same hydraulic pressure is inputted to the first and second control ports "a" and "b" in the state in which the lock pressure is not inputted to the third control port "c", the spool moves to the left position due to the difference in the pressure receiving area between both of the ports "a" and "b", and the high cut valve 114 transitions to the second state.

Figure 6:
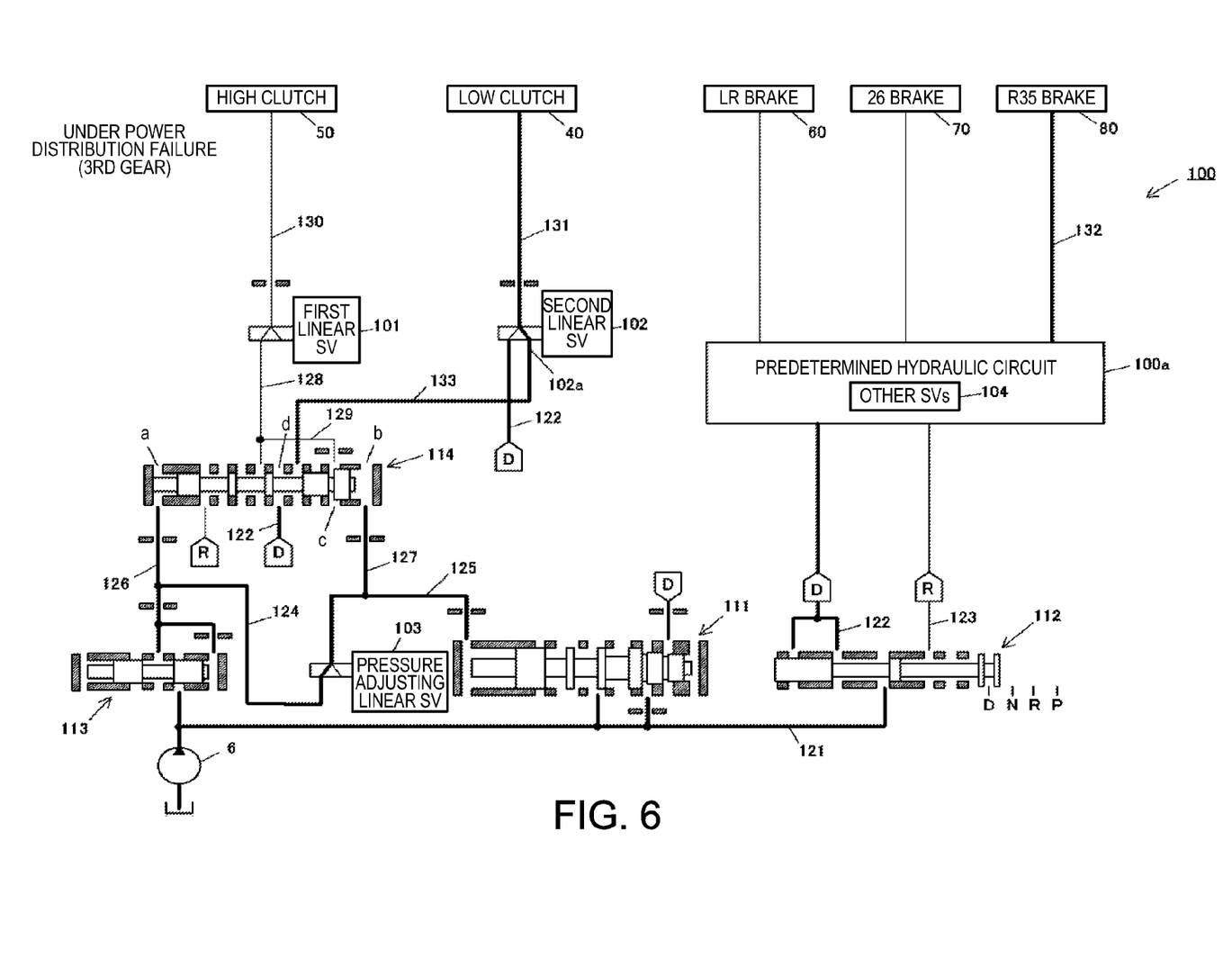
FIG. 6 is a hydraulic circuit diagram showing a state with a low gear position at the time of a power distribution failure.

Further, if the gear position is switched to the D-gear position range again when, for example, the vehicle restarts, although, as shown in FIG. 6, the line pressure is outputted from the manual valve 111 to the D-gear position range line 122 again and is further inputted to the input port "d" of the high cut valve 114, because the valve 114 is in the second state and the spool is at the left position as described above, the line pressure inputted to the input port "d" is outputted to the line 133 communicating with the drain port 102*a* of the second linear SV 102.

The second linear SV 102 is the normally closed type that closes without the power distribution, and, when in a state in which the SV 102 is closed, interrupts the flow between the lines 122 and 131 on the upstream and downstream thereof, respectively, and communicates the line 131 on the downstream with the drain port 102a. Therefore, the line pressure inputted from the high cut valve 114 to the drain port 102a of the SV 102 via the line 133 is supplied to the low clutch 40 via the line 131.

Further, in this case, because the high cut valve 114 interrupts the flow between the D-gear position range line 122 and the line 128 leading to the first linear SV 101, the line pressure is not supplied to the high clutch 50.

Moreover, because each of the other SV(s) 104 in the predetermined hydraulic circuit 100a opens or closes without the power distribution, similar to before the gear position is switched to the N-gear position range, the line pressure is supplied from the D-gear position range line 122 to the R35 brake 80 via the line 132, and the R35 brake 80 is coupled. Thereby, the low clutch 40 is coupled and the R35 brake 80 is coupled and the gear position becomes the third gear. Therefore, when restarting the vehicle in the D-gear position range after switching to the N-gear position range in the power distribution failure state, the vehicle starts in the third gear.

That is, by switching to the N-gear position range once, the high cut valve 114 switches from the first state to the second state, and the input port "d" to which the D-gear position range line 122 inputs the line pressure switches from the state of being communicated with the lines 128 and 130 (corresponding to the first oil path in the claims) leading to the high clutch 50 to the state of being communicated with the lines 133 and 131 (corresponding to the second oil path in the claims) leading to the low clutch 40. Thereby, between before and after the N-gear position range state, the gear position switches from the fifth gear that is a high gear position where the high clutch 50 is coupled and the R35 brake 80 is coupled, to the third gear that is a low gear position where the low clutch 40 is coupled and the R35 brake 80 is coupled.

Note that, even in a case where the engine is restarted to start the vehicle again after the power distribution failure occurs and then the vehicle is stopped for a while and the engine is also stopped, the gear position is operated to either one of the N-gear position range and the P-gear position range for a while, therefore, the operations above are performed in the hydraulic control circuit 100.

As above, when the power distribution failure occurs to each of the SVs in the hydraulic control circuit 100 during travel in the D-gear position range, because the gear position is set to a predetermined high gear position, a situation such as the engine brake suddenly operates from the normal traveling state is avoided, and driver discomfort is suppressed. Further, after the vehicle is stopped for a while and the gear position is switched to the N-gear position range, or after the engine is stopped and then the engine is restarted, and when the vehicle restarts in the D-gear position range, by setting the gear position to a predetermined low gear position, a required start acceleration performance can be obtained. Thus, a traveling performance of the vehicle at the time of occurrence of the power distribution failure can be secured.

Moreover, in the above embodiment, the SV for changing the control pressure to be inputted to the second control port "b", so as to set the state of the high cut valve 114 between the first and second states according to whether the power distribution failure is occurred, corresponds to the pressure adjusting linear SV 103, for generating the hydraulic pressure for the line pressure adjustment to be supplied to the regulator valve 111, therefore, the single SV serves as both the line pressure adjustment and the fail safe measure at the time of power distribution failure. Thus, compared to the case of performing these functions by different SVs, respectively, the configuration of the hydraulic pressure control circuit 100 is simplified and, as a result, an increase in cost of manufacturing the automatic transmission is suppressed.

As above, according to the present invention, even in the case where the power distribution failure to the solenoid valves of the hydraulic control circuit occurs, the automatic transmission with which the good traveling performance is maintained is realized and, therefore, the present invention can suitably be utilized in industries of manufacturing such kind of automatic transmission and vehicle equipped therewith.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE NUMERALS

1 Automatic Transmission
6 Oil Pump
40 Second Friction Element
50 First Friction Element
100 Hydraulic Control circuit
103 Pressure Reducing Valve (Pressure Adjusting Linear SV)
111 Hydraulic Pressure Adjusting Valve (Regulator Valve)
114 Switch Valve (High Cut Valve)
128, 130 First Oil Path (Line)
133, 131 Second Oil Path (Line)
a First Control Port
b Second Control Port
c Third Control Port
d Input Port

The invention claimed is:

1. A hydraulic control device of an automatic transmission including a hydraulic control circuit provided with a plurality of friction elements to be coupled by being supplied with a line pressure and a plurality of hydraulic control valves, the hydraulic control circuit achieving a gear position corresponding to an operating state of an engine by selectively supplying the line pressure to one or more of the friction elements, and the device comprising:

a pressure reducing valve;
a first friction element for achieving a first gear position and a second friction element for achieving a second gear position that produces a lower speed than the first gear position, the pressure reducing valve serving as one of the plurality of hydraulic control valves to reduce the line pressure; and
a switch valve formed with an input port to be inputted with the line pressure in a forward gear position range, and for switching its state between a first state where the input port is communicated with a first oil path communicating with the first friction element in a state of failure of power distribution to the plurality of hydraulic control valves and a second state where the input port is communicated with the second friction element in the same power distribution failure state,
wherein the switch valve is formed with, as ports for switch control, a first control port to which a first control pressure is inputted so that the switch valve is biased toward the first state, a second control port to which a second control pressure outputted from the pressure reducing valve is inputted so that the switch valve is biased toward the second state, and a third control port to which the line pressure is inputted only when the line pressure is inputted to the input port in the first state and for fixing the switch valve in the first state regardless of the control pressures at the first and second control ports, and wherein in a state where the line pressure is not inputted to the third control port and the control pressure is inputted to the first control port, the switch valve transitions to the first state when the control pressure inputted to the second control port is reduced by the pressure reducing valve, and the switch valve transitions to the second state when the control pressure inputted to the second control port is not reduced by the pressure reducing valve.

2. The device of claim 1, further comprising a hydraulic pressure adjusting valve for generating the line pressure by adjusting a discharging pressure of an oil pump that is driven by the engine, wherein the hydraulic pressure adjusting valve is formed with a pressure adjusting port to which the control pressure outputted from the pressure reducing valve is inputted and adjusts the line pressure according to the control pressure.

3. The device of claim 1, wherein the switch valve is formed with the first control port on one end side of a spool and the second control port on the other end side of the spool, and a pressure receiving area of the second control port side of the spool is formed larger than a pressure receiving area of the first control port side so that in a state where the line pressure is not inputted to the third control port and the first control pressure is inputted to the first control port, the switch valve transitions to the second state when the second control pressure inputted to the second control port is not reduced by the pressure reducing valve.

4. The device of claim 3, further comprising a hydraulic pressure adjusting valve for generating the line pressure by adjusting a discharging pressure of an oil pump that is driven by the engine, wherein the hydraulic pressure adjusting valve is formed with a pressure adjusting port to which the control pressure outputted from the pressure reducing valve is inputted and adjusts the line pressure according to the control pressure.

5. The device of claim 1, wherein the pressure reducing valve is a normally open solenoid valve for reducing the line pressure in a power distributing state to output the second control pressure that is lower than the first control pressure.

6. The device of claim 5, wherein the switch valve is formed with the first control port on one end side of a spool and the second control port on the other end side of the spool, and a pressure receiving area of the second control port side of the spool is formed larger than a pressure receiving area of the first control port side so that in a state where the line pressure is not inputted to the third control port and the first control pressure is inputted to the first control port, the switch valve transitions to the second state when the second control pressure inputted to the second control port is not reduced by the pressure reducing valve.

7. The device of claim 5, further comprising a hydraulic pressure adjusting valve for generating the line pressure by adjusting a discharging pressure of an oil pump that is driven by the engine, wherein the hydraulic pressure adjusting valve is formed with a pressure adjusting port to which the control pressure outputted from the pressure reducing valve is inputted and adjusts the line pressure according to the control pressure.

8. A method of controlling an oil pressure of an automatic transmission including a hydraulic control circuit provided with a plurality of friction elements to be coupled by being supplied with a line pressure and a plurality of hydraulic control valves, the hydraulic control circuit achieving a gear position corresponding to an operating state of an engine by selectively supplying the line pressure to one or more of the friction elements, and the method comprising:

reducing the line pressure by a pressure reducing valve, the pressure reducing valve serving as one of the plurality of hydraulic control valves;

using a first friction element for achieving a first gear position and using a second friction element for achieving a second gear position that produces a lower speed than the first gear position; and switching a state of a switch valve formed with an input port to be inputted with the line pressure in a forward gear position range, between a first state where the input port is communicated with a first oil path communicating with the first friction element in a state of failure of power distribution to the plurality of hydraulic control valves and a second state where the input port is communicated with the second friction element in the same power distribution failure state, wherein the switch valve is formed with, as ports for a switch control, a first control port to which a first control pressure is inputted so that the switch valve is biased toward the first state, a second control port to which a second control pressure outputted from the pressure reducing valve is inputted so that the switch valve is biased toward the second state, and a third control port to which the line pressure is inputted only when the line pressure is inputted to the input port in the first state and for fixing the switch valve in the first state regardless of the control pressures at the first and second control ports, and wherein in a state where the line pressure is not inputted to the third control port and the control pressure is inputted to the first control port, the switch valve transitions to the first state when the control pressure inputted to the second control port is reduced by the pressure reducing valve, and the switch valve transitions to the second state when the control pressure inputted to the second control port is not reduced by the pressure reducing valve.

* * * * *